United States Patent [19]

Hopey

[11] Patent Number: 5,836,213
[45] Date of Patent: *Nov. 17, 1998

[54] STEERING DAMPER IN AND FOR VEHICLES

[76] Inventor: Timothy C. Hopey, 4300 Rosanna Dr., Allison Park, Pa. 15101

[*] Notice: The term of this patent shall not extend beyond the expiration date of Pat. No. 5,492,033.

[21] Appl. No.: 392,516

[22] Filed: Feb. 23, 1995

Related U.S. Application Data

[63] Continuation-in-part of Ser. No. 176,659, Jan. 3, 1994, Pat. No. 5,492,033.

[51] Int. Cl.$^6$ .................................................. B62K 21/12
[52] U.S. Cl. ...................... 74/551.2; 74/551.1; 280/272; 280/276; 280/279
[58] Field of Search ............................ 74/551.1–551.8; 280/272, 276, 279

[56] References Cited

U.S. PATENT DOCUMENTS

| | | | |
|---|---|---|---|
| 5,285,697 | 2/1994 | Clausen | 280/276 X |
| 5,305,654 | 4/1994 | Durham | 280/279 X |
| 5,359,910 | 11/1994 | Chang et al. | 74/551.1 X |

FOREIGN PATENT DOCUMENTS

| | | | |
|---|---|---|---|
| 134671 | 4/1933 | Austria | 280/272 |
| 538639 | 6/1922 | France | 280/272 |
| 5-105172 | 4/1993 | Japan | 280/276 |
| 717259 | 10/1954 | United Kingdom | 280/276 |

*Primary Examiner*—Vinh T. Luong
*Attorney, Agent, or Firm*—Hymen Diamond

[57] ABSTRACT

A steering damper particularly for mountain bicycles of the type having a steer-tube including a cylinder having closures at the ends filled with oil of high viscosity. Within the cylinder there are a dam and vanes. The dam is rotatable on a shaft from a center position towards and away from the vanes. The shaft is connected to the handlebars and is rotatable with the handlebars which are connected to control the steering movement of a steerable wheel through the steer-tube. The steering damper is integrated with the steer-tube and with the handlebars and steer-stem. The vanes of the steering damper are connected to the frame and are fixed. The housing and dam connected internally to the housing are disposed in, and connected to, the steer-tube so that when the handlebars are rotated, the housing and dam are rotated relative to the vanes. When the handlebars are being displaced from center, pressure is applied to the oil between the dam and a vane and the movement is damped. On the return stroke of the handlebars, the one-way valve in the vane involved is open, the oil between the dam and the vane is discharged, pressure is reduced and the damping is suppressed.

18 Claims, 5 Drawing Sheets

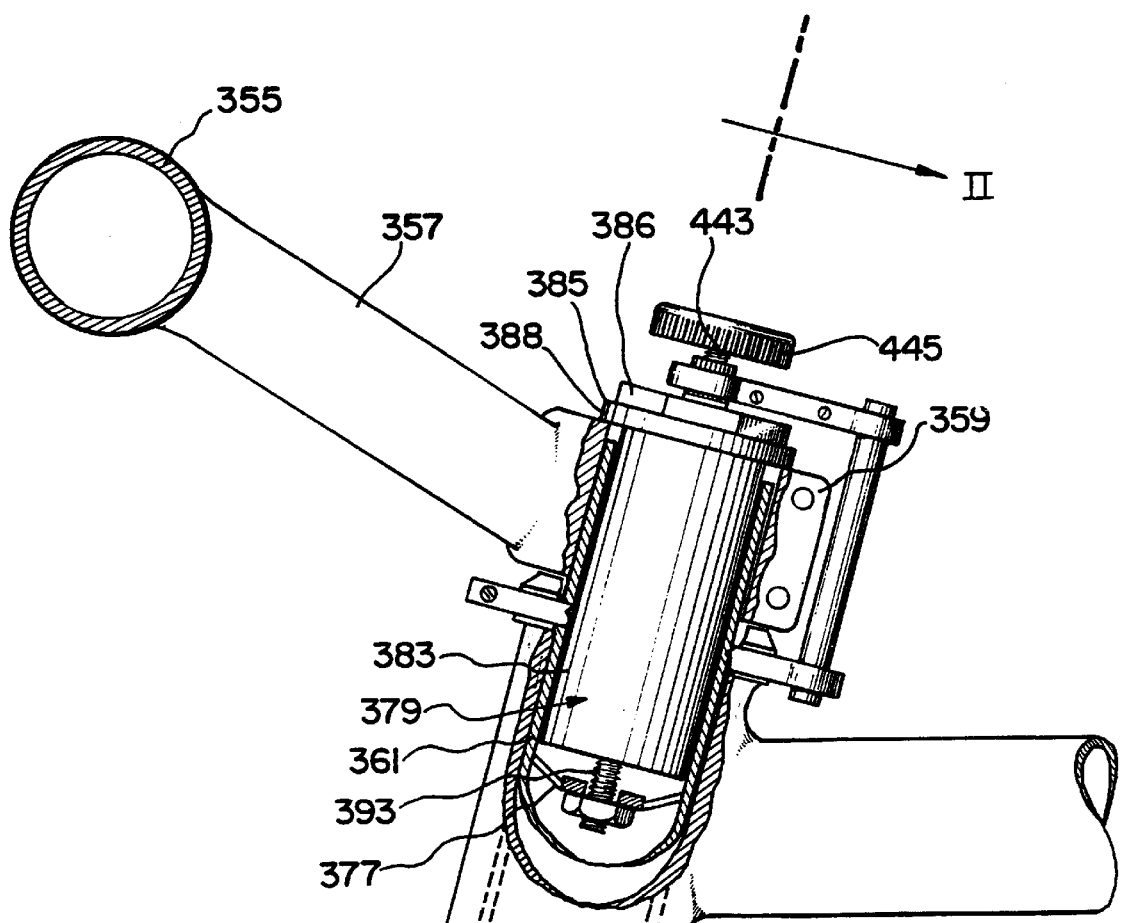
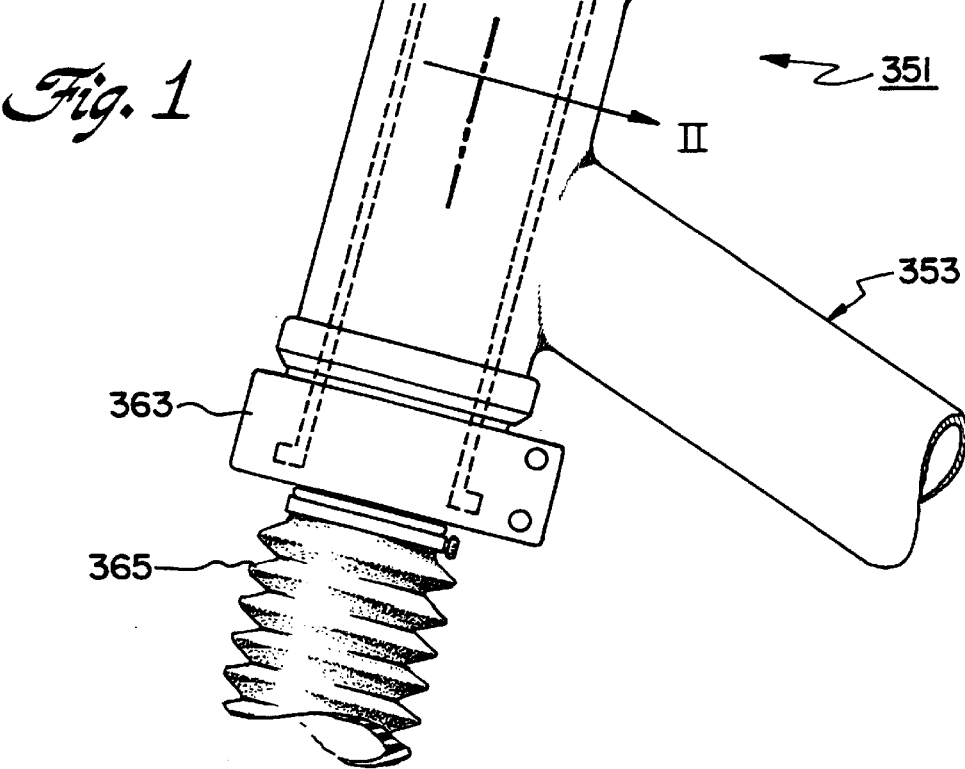
Fig. 1

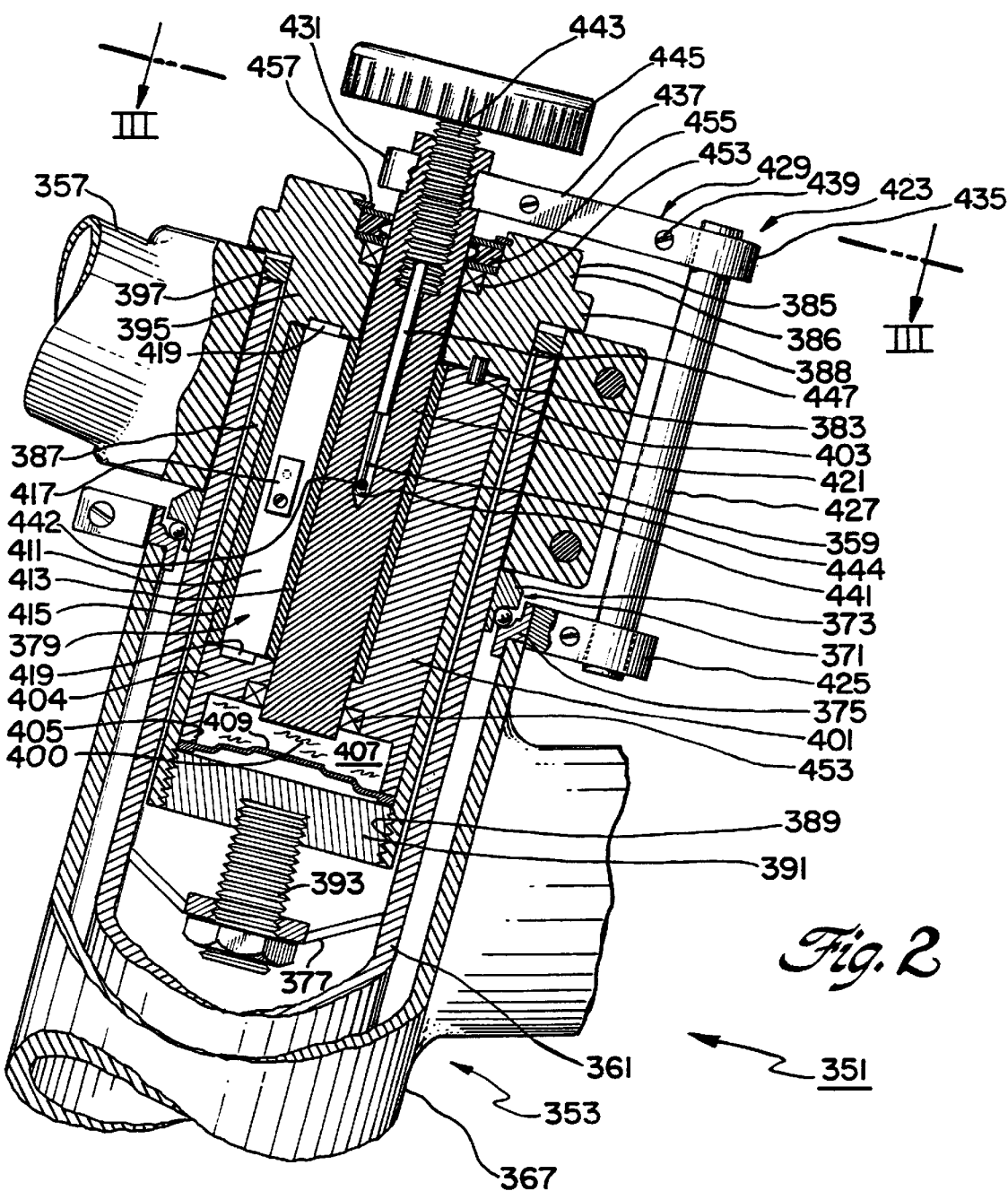
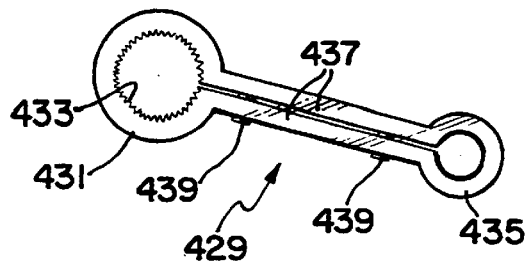
Fig. 2
Fig. 3

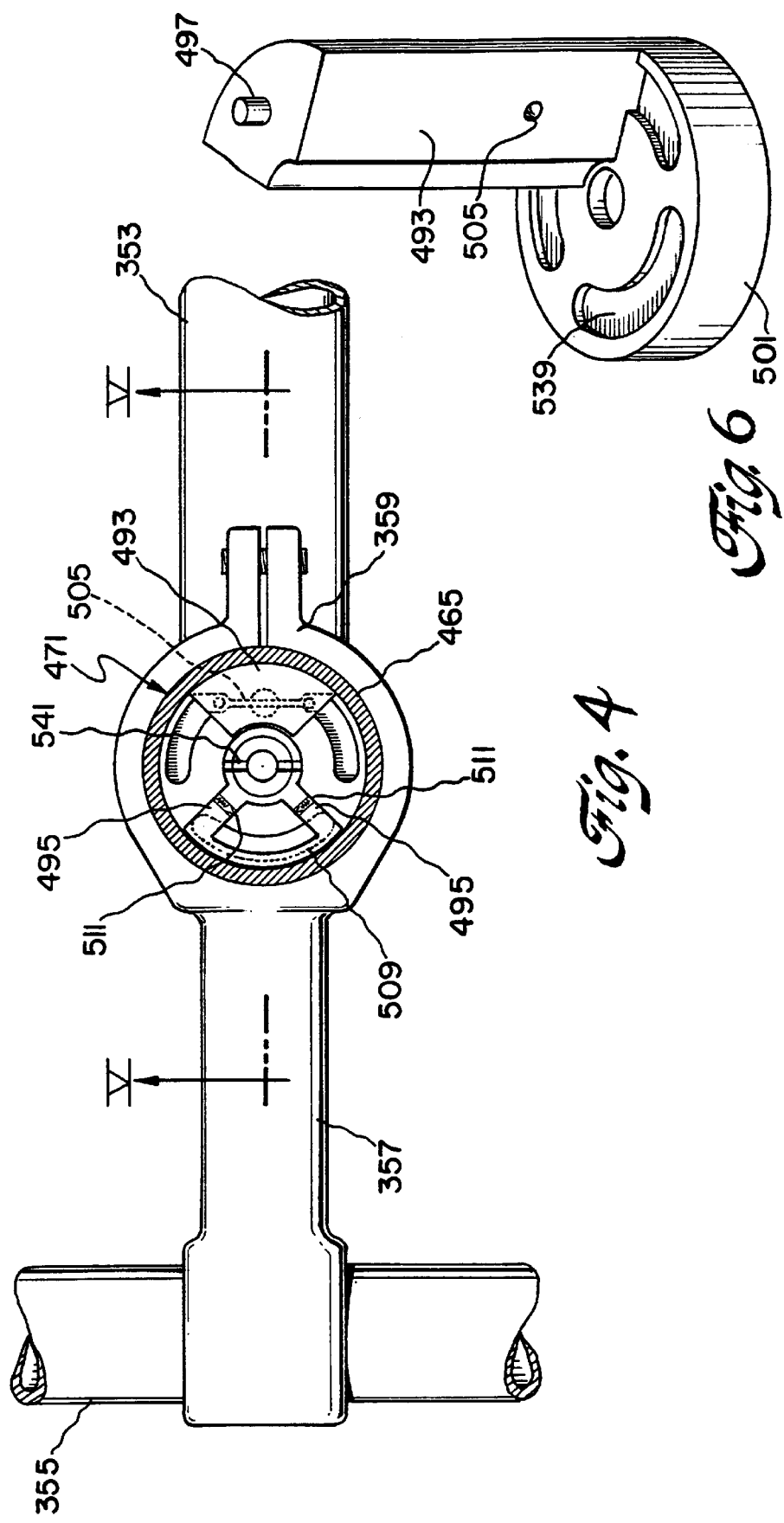

STEERING DAMPER IN AND FOR VEHICLES

REFERENCE TO RELATED APPLICATION

This application is a continuation-in-part of application Ser. No. 08/176,659, filed Jan. 3, 1994, for STEERING DAMPER IN AND FOR VEHICLES, now U.S. Pat. No. 5,492,033 granted Feb. 20, 1996.

BACKGROUND OF THE INVENTION

1. Field of the Invention

This invention relates to vehicles and it has particular relationship to bicycles. It is to be understood that, to the extent that the principles of this invention are adapted to other vehicles than bicycles, for example, motorcycles, or even automobiles or trailer couplings, such adaptation is to be regarded as within the scope of equivalents of this invention.

2. Description of the Prior Art

Parent patent '033 is directed to a meritorious invention which, embodied in bicycles, has performed highly satisfactorily. But in this invention, a steering damper is created for, and is integrated into, a bicycle in which a quill-type or arm 45 (FIG. 24) fits into the head 37 which is part of the frame 47 of the bicycle connecting the handlebars to the steering arm 253 and through it and fork head 95 to fork 35 and the steerable wheel.

It is an object of this invention to provide a vehicle which, in addition to the advantages featured and meeting the objects of patent '033, having a steering damper more intimately integrated therein than in the invention of patent '033, and a steering damper adapted to be so integrated in the vehicle and thereby to simplify the structure of the integrated vehicle. Specifically, it is an object of this invention to provide a vehicle, known in the art as a steer-tube/clamp-type bicycle, having a clamp-type stem clamped to the outside of a steer-tube, having a steering damper integrated therein and a steering damper adapted to be so integrated.

SUMMARY OF THE INVENTION

In arriving at the invention of patent '033 and of the invention, it was realized that, to prevent a bicycle from leaving a trail when its front wheel contacts an object, prompt and effective counteraction or remedial action is indispensable. The handlebar control of the bicycle must lend itself to immediate resetting of the handlebars to a setting which will enable the driver to prevent it from leaving the trail and also allow the bicycle as a whole to return to center. The steering stabilizing of the prior art as typified by Gustafsson U.S. Pat. No. 4,773,514 and Motrenec U.S. Pat. No. 4,736,902 reduces the rate at which the steerable wheel and the handlebars are displaced or deflected, but they also resist return of the steerable wheel and the handlebars to center by the driver.

In accordance with this invention, a steering damping is provided for and intimately integrated into a bicycle to facilitate the steering and enhance the stability of the bicycle. This steering damping is effective as the bicycle handlebars actuated by the steerable wheel are turned away from straight-line riding or "center", i.e., as in turning the bicycle right or left, but offers negligible or no damping effect when returning the bicycle handlebars and the steerable wheel back toward straight-line riding or "center".

Specifically, the steering damping is in accordance with this invention, effected by a steering damper which includes a container filled with oil and having closures at the ends thereof. Within the container there is a dam and a vane assembly including vanes extending from a shaft. The vanes at their ends extend axially to the closures and radially to the wall of the container between the closures. The vane assembly and the dam are rotatable one relative to the other. The steering damper is mounted on or integrated with a vehicle which has handlebars which are rotatable or pivotal about an axis and are connected to a steerable wheel. The handlebars are rotatable or pivotal in synchronism with the steerable wheel either to steer the wheel or to be rotated by the wheel when the wheel undesirably contacts an obstruction over which the vehicle is moving. As disclosed in the parent patent '033, the steering damper is mounted with its shaft of the vane assembly coaxial with or connected to the axis about which the handlebars rotate, rotatable in synchronism with the rotation of the handlebars and the steering rotation of the steerable wheel.

In accordance with this invention, the steering damper is integrated into a vehicle or bicycle having a steer-stem connecting handlebars to a steer-tube rotatable with the handlebars through which the handlebars are steerably connected to a steerable wheel. A steer-tube is defined as a hollow tube in a bicycle connected to the handlebars at one end and to the steerable wheel at the opposite end, the turning of the handlebars causing the steer-tube to rotate and in turn turning the steerable wheel to direct the bicycle in the direction set by the rotation of the handlebars. The head tube of a bicycle is not a steer-tube. The steer-tube rotates inside of the head tube. The steering damper has a housing containing fluid which is mounted in the steer-tube rotatable therewith and thus intimately integrated with the bicycle. The housing contains vane means which extends from a shaft and a dam. The vane means and the dam are rotatable one relative to the other. Specifically, the dam may be connected to the housing and the vane means and the unit consisting of the housing and the dam may be rotatable one relative to the other. In the alternative, the steer-tube may serve as the housing, thus performing a double function.

The steer-tube carries a star nut. In accordance with the teachings of the prior art, a bolt connects the steer-stem to the star nut to apply pressure to the bearings which support the steer-tube to the frame. In the practice of this invention, the bolt is removed and a steering damper is mounted in the steer-tube with its container connected to the steer-stem rotatable with the handlebars. This container has a bolt which is screwed into the star nut, both applying pressure to the bearings and supporting the steering damper. In light of the structure described above, the vehicle into which the steering damper is integrated in the practice of this invention may be appropriately described as having a hollow steer-tube when referring to this invention.

In accordance with another modification of this invention, the steer-tube serves as the container for the damper. In this case, a part of the steer-tube is sealed, contains fluid and carries a dam. A vane within the steer-tube is secured fixed to the frame. The handlebars are connected to the steer-tube and thus to the steerable wheel through the steer-stem.

In the practice of this invention, rotation of the handlebars from center rotates the container with the steer-tube or the steer-tube when it serves as container and the dam connected to these components, as the case may be, compressing the fluid between the dam and the vanes and holding closed a one-way valve in the vanes, thus damping the departure of the handlebars from center. On the return of the handlebars to center, the one-way valve opens and the fluid flows through the vanes and recesses into a chamber constructed to receive the fluid relaxing the damping pressure against the handlebars. An important advantage of this invention with respect to parent patent '033 is that the structures for mounting the steering damper shown in FIGS. 2, 6, 7 of patent '033 are dispensed with.

The use of the word "fluid" in this application and in the claims are intended to include within their scope resilient media of any appropriate type including oils, gases and elastomers such as sponges and the like.

BRIEF DESCRIPTION OF THE DRAWINGS

For a better understanding of this invention, both as to its organization and to its method of operation, together with additional objects and advantages thereof, reference is made to the following description taken in connection with accompanying drawings, in which:

FIG. 1 is a view in side elevation of an embodiment of this invention with the upper part broken away to show a steering damper integrated into a vehicle;

FIGS. 2A and 2B are fragmental views showing a valve for varying the resistance to displacement from center depending upon the velocity of displacement;

Fig. 3 is a view in top elevation taken in direction III—III of FIG. 2 showing the clamp which holds the vane assembly of the steering damper of the apparatus shown in FIG. 2 fixed;

Fig. 4 is a plan view with the steer-tube in transverse section of another modification of this invention;

FIG. 6 is a fragmental view in isometric showing the relationship of the dam and the part of the container to which it is connected.

DETAILED DESCRIPTION OF EMBODIMENTS

Figure 2:
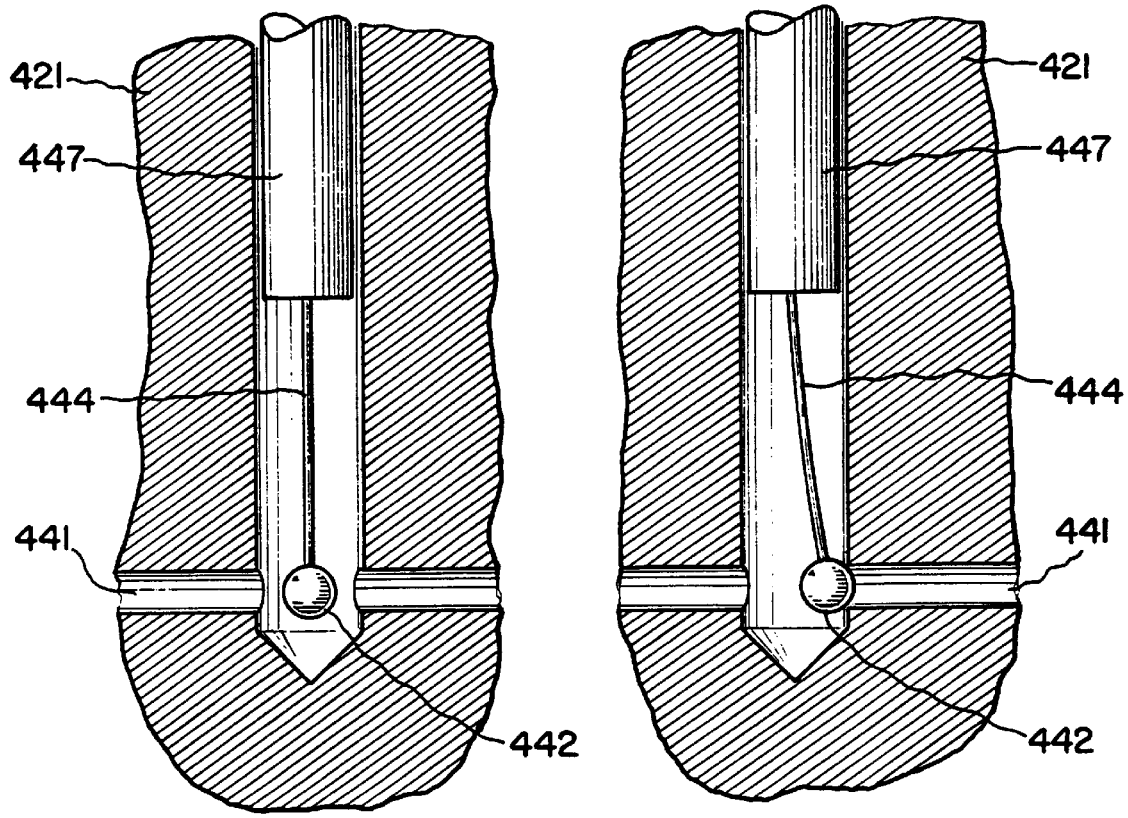
FIG. 2 is a view in longitudinal section taken along line II—II of FIG. 1 but showing a modification of the clamp assembly shown in FIG. 1.

The invention shown in FIGS. 1, 2, 2A, 2B, 3, 4 is a steer-tube/stem-type bicycle 351 including a frame 353 and handlebars 355 extending from a steer-stem 357. A clamp 359 extends integrally from the steer-stem 357. The clamp 359 clamps the steer-stem 357 to a steer-tube 361. The steer-tube 361 is connected by clamp 363 to fork 365 which is connected to a steerable wheel (not shown). The steer-tube 361 extends through a head 367 (FIG. 2) which is an integral part of the frame 353. The handlebars 355, steer-stem 357 and steer-tube 361 and the parts connected between the steerable wheel (not shown) and the steer-tube 361 are rotatable on bearings 371 (only upper bearing shown in FIG. 2) to steer the bicycle 351 through the steerable wheel. The moving race 373 of bearing 371 is secured to, or integral with, the steer-tube 361 and fixed race 375 is secured to, or integral with, the head 367.

In accordance with teachings of the prior art, pressure is applied to the bearings by a bolt (not shown) between a cap (not shown) mounted on clamp 359 and a star nut 377 engaging and secured to the inner wall of the steer-tube 361. In accordance with this invention, the cap and bolt are replaced by a steering damper 379 which, in addition to damping the displacement from center of the handlebars 355 and the components connected to it, also applies the pressure to the bearings 371.

The steering damper 379 includes a housing 383 of generally circularly, cylindrical shape. The housing 383 has a top closure or cap 385 from which a generally circularly, cylindrical shell 387 extends. The cap 385 includes an outer hexagonal or flat-sided member 386 (FIG. 2) which extends integrally from a circular member 388. The shell 387 has an internal thread 389. The bottom closure 391 has an internal thread which engages thread 389 and is secured through the threaded joint to the shell 387. The interior of the housing 383 is thus defined between the closure 385, the shell 387 and the bottom closure 391. A stud 393 extends centrally from the bottom closure 391. The stud 393 is screwed into the star nut 377. The star nut 377 applies tension to the stud 393, applying pressure to the bearings 371 through the bottom closure 391, the shell 387, the cap 385, the clamps 359 and the upper race 373. Between the stem 395 of the cap 385 and the clamp 359, there is a securing ring 397 which is compressed by clamp 359 and assures that the housing rotates with the steer-stem 357 and the handlebars.

Within the housing 383, there is a dam 401. The dam has the shape of a prism, typically subtending an angle of about 90°. The dam 401 is connected to the stem 395 of the cap 385 by dowel pins 403 and is rotatable with the housing 383. A generally circular annulus 404 extends from the lower end of the dam 401 and a circularly, cylindrical skirt 405 extends from the annulus defining a chamber 407 with the bottom closure 391. A diaphragm 409, whose periphery is secured between the end of the skirt 405 and the bottom closure 391, serves to absorb the pressure differentials of the damping fluid 400 with which the housing is filled when the steering damper is carrying out a damping operation.

Within the housing 383, there are also vanes 411 (only one shown) which extend radially from a hollow hub 413. Typically, the angle between the vane 411 is such that the region defined by the surfaces of the dam is divided into three sectors of about 90° each. At their ends, the vanes 411 are joined by an arcuate member 415. The member 415 reduces the leakage of the fluid between the vanes and the inside wall of the container 361. Each vane has a one-way poppet valve 417. This valve 417 is closed when the pressure of the fluid in the chamber defined by the dam 401 and the vane in which it is contained is increased because the dam is approaching the last-named vane and is open when the pressure in this chamber is decreasing because the dam is receding from this vane. There are grooves or recesses 419 (FIG. 2) in the inner surface of the top closure 385 and the bottom closure 391.

A generally circularly, cylindrical shaft or bar 421 extends through and is secured to the hub 413 of the vanes 411 (FIG. 2). The bar 421 is fixed by a clamp assembly 423. The clamp assembly includes a clamp 425 secured to the race 375 of bearing 371 and thus to tube 367 of frame 353, a rod 427, and another clamp 429 (FIG. 2). The clamp 429 includes a circular yoke 431 having internal spline 433 at one end and smooth yoke 435 at the opposite end. The clamp 429 is of integral structure with spaced linear members 437 between the yokes 431 and 435. Bolts 439 are provided to pull the linear members together to enable the yokes 431 and 435 to exert clamping force. The spline 433 of yoke 431 engages a matching spline (not shown) in bar 421. The rod 427 is secured to clamp 425 and yoke 435 completing the clamping assembly 423 and securing the bar 421 and the vanes 411 connected to the bar against rotation with the handlebars 355.

The bar 421 has a hole 441 (FIGS. 2, 2A, 2B) through which the compressed fluid from the chamber in which it is compressed can flow into a chamber in which the fluid is expanded. The area of the hole 441 can be adjusted by screw 443 having a knurled head 445 threaded into bar 421 and carrying a ball 442 extending from a cantilever spring 444 suspended from the inner end of screw 443. The position of the ball 442 is adjustable; it is centered transversely in the hole 441 (FIG. 2A). The ball 442 is moved by the fluid which is pressurized by the displacement of the handlebars 355 in dependence upon the speed of displacement, i.e., the speed of the fluid flow through the hole 441, is determined by the pressure of the speed of displacement of the handlebars. When the speed is low, corresponding to low speed displacement of the handlebars, the ball 442 suffers a small displacement offering smaller resistance to the displacement of the handlebars. When the speed of rotation of the handlebars is high, the displacement of the ball 442 is greater reducing the area of the hole which passes the fluid and offering higher resistance to the displacement of the handlebars.

This feature is shown integrated in the embodiment of this invention shown in FIG. 2 of this application. It is to be understood that this feature may and can be incorporated in all other modifications of this invention.

When the handlebars 355 are rotated, the housing 383 rotates on bearings 453 which are seated in the cap 385 and in the annulus 404 extending from the dam 401. Above the upper bearing 453, there is a seal 455 to suppress the outflow of the fluid under pressure. The seal is held by a retainer ring 457.

In the use of this invention when the handlebars 355 are displaced from center, the housing 383 is rotating, carrying with it the dam 401 and compressing the fluid between the dam and an associated vane 415 and damping the motion of the handlebars. On the return stroke of the handlebars, the grooves 419 and opened one-way valve 417 allow fluid to flow past the vanes.

Figure 5:
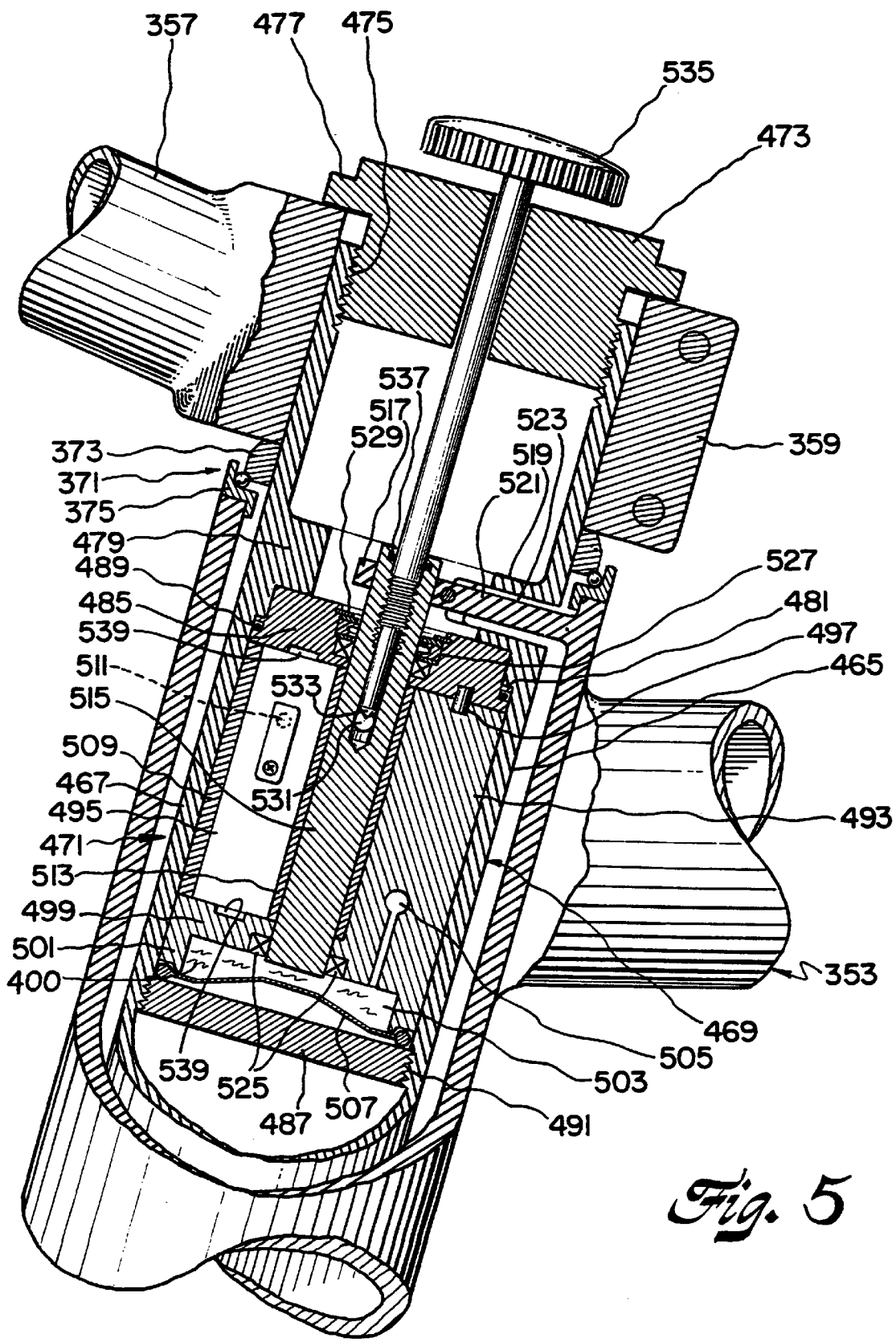
FIG. 5 is a view in longitudinal section taken along lines V—V of FIG. 4 with parts unsectioned.

In the modification shown in FIGS. 4 and 5, a portion 465 (FIG. 5) of the steer-tube 467 serves as the sidewalls for the housing 469 of the steering damper 471. A steer-stem cap 473 is screwed into thread 475 near the top of the steer-tube 467. The cap 473 has a flange 477. The cap 473 is secured tightly in the thread 475 with the flange 477, applying substantial pressure to the clamp 359 and thus to the bearings 371 through the upper races 373.

The steer-tube has an internal flange or projections 479. Projection 479 has a window 523 to allow rod/shaft 515 to be fixed to bicycle frame 353 via clamp 517 and inward projection 521. The housing 469 of the steering damper is formed by the wall portion 465 of the steer-tube 467, the cap or top 485, and the bottom closure 487. The top 485 is seated against formed flange 479. There is an O-ring seal 489 between the outer surface of the top 485 and the inner surface of the wall 465. The bottom closure 487 is screwed into a thread 491 in the wall portion 465.

Within the housing 469 there is a dam 493 and vanes 495. The dam 493 is similar to the dam 401 of the embodiment shown in FIGS. 1, 2, 3. It is connected to the top 485 by dowel pin 497 and is rotatable with the housing. A generally circular annulus 499 extends from the lower end of the dam and a circularly, cylindrical skirt 501 extends from the annulus 499. Between the annulus 499, the skirt 501 and diaphragm 507, a reservoir of damping fluid 503 is contained. Supply valve 505 (FIGS. 4 and 5) extends into the dam 493. The valves 505 allows the damping fluid in reservoir 503 to help fill increasing volume defined when dam 493 moves away from a vane 495. A diaphragm 507 serves to reduce pressure differentials.

The vanes 495 typically define a sector of about 90° (FIG. 4). Typically, there are sectors of about 90° between the vane 495 at center and the dam 493 and the dam extends over a sector of about 90°. The dam 493 is thus movable in either direction with the closure 469 over an angle of about 90° on displacement of the handlebars 355. The vanes are joined by arcuate member 509 (FIG. 4) at their ends. Each vane 495 has a one-way poppet valve 511 which closes under pressure of the fluid when the handlebars 355 are being displaced away from center in either direction and opens as the handlebars 355 are returning to center.

The vanes 495 diverge radially from a hub 513 (FIG. 5) centrally of the housing 469. A shaft or rod 515 extends through and is secured to the hub and through the hub it forms a rigid structure with the vanes. The rod 515 and through it the parts connected to it are held fixed by a clamp 517 extending from an inward projection 521 of the frame 353 which passes through window 523 in the steer-tube 469.

When the handlebars 355 are displaced, the steer-stem 357, the clamp 359, the steer-tube 467, including the enclosure 469 and the dam 493 are rotated. Bearings 525 are provided in the cap 485 and the annulus for the rotatable members. The rod 515 extends into the enclosure 469 through a seal 527 held by a retainer ring 529.

The rod 515 has an opening through which a measured quantity of fluid passes from a region under pressure to a region in which the pressure is reduced. The area of the opening is adjustable by the tip 533 of a screw 535 which passes through the cap 473 and is adjustably screwed into the rod through an O-ring seal 537. The cap 485 and bottom 499 are provided with recesses or grooves 539 so the fluid can bypass the vane to suppress damping on the return of the handlebars 355 to center and when the handlebars are turned beyond 35° from center as in a slow tight corner. There are fluid passages 541 through the hub 513 and rod 515 (FIG. 4).

While preferred embodiments of this invention are disclosed herein, it is understood that many modifications thereof are feasible. While the practice of this invention with a plurality, usually two vanes are to be preferred, this invention may also be practices with one vane which would sweep in either direction from center in synchronism with the handlebars, compressing the fluid in one chamber defined between the vane and a dam and relaxing the fluid in the other chamber defined between it and the dam. With reference to the modifications shown in FIGS. 1 through 5, the cross dimension of the steering damper is limited by the diameter of the head or steer-tube. It may therefore be necessary to increase the length of the damper and the vanes and dam to assure adequate damping. This invention is not to be restricted except insofar as is necessitated by the spirit of the prior art.

I claim:

1. A vehicle having a frame including a head tube, rotatable handlebars connected to said frame, steerable wheel means, a steer-tube connected to said steerable wheel means, rotatable within said head tube to seer said steerable wheel means, means, connecting said handlebars to said steer-tube for rotating said steer-tube and through said steer-tube said steerable wheel means for steering said steerable wheel means by rotation of said handlebars, a steering damper within said steer-tube, said steering damper having a container for damping fluid, vane means in said container, means, cooperative with said vane means, for producing damping by said fluid on rotation of said container from a center relative to said vane means, and means connecting said handlebars to said container cooperative to rotate said container together with said steer-tube and said steerable wheel means synchronously with said handlebars relative to said vane means to damp the displacement from center of said handlebars by action of said means cooperative with said vane means.

2. The vehicle of claim 1 wherein the means cooperative with the vane means for producing damping includes a dam connected to the container rotatable therewith to apply pressure to the fluid between the dam and said vane means on rotation of said container.

3. The vehicle of claim 1 characterized by vane means including valve means responsive to return to center of handlebars displaced from center for suppressing damping on return of the handlebars from a displacement from center.

4. A vehicle having a frame including a head tube, handlebars connected rotatable about a center to said frame, a steer-tube within said head tube rotatably connected to said frame, steerable wheel means connected to said steer-tube to be moved to steer said vehicle on rotation of said steer-tube; a steering damper having means within said steer-tube actuable on rotation of said steer-tube for damping the rotation of said handlebars on the displacement of said handlebars from center, said steer-tube having means, interconnecting said handlebars and said steer-tube to rotate said steer-tube in synchronism with said handlebars, thereby to move said steerable wheel means from center to steer said vehicle; and also through said actuable means of said steering damper to actuate said damping means to damp the rotation of said handlebars, and means, connected to said steering damper responsive to the return rotation to center of said displaced handlebars to center to suppress the damping of said damping means.

5. A vehicle having a frame including a head tube, handlebars rotatably connected to said frame, steerable wheel means, means interconnecting handlebars and said steerable wheel means, said interconnecting means including a steer-tube rotatable within said head tube, said handlebars, steer-tube and steerable wheel means being positioned in a center on linear movement of said vehicle and rotation of said handlebars from center producing corresponding steering rotation of said steer-tube and steerable wheel means, and steering rotation from center of said steerable wheel means, as by encounter with an obstruction, from center producing corresponding rotation of said steer-tube and handlebars from center; a steering damper including a container for damping fluid and also having vane means therein, said container being in said steer-tube, means connecting said container to said handlebars movable relative to said vane means from center on movement from center of said steer-tube as the result of rotation of said handlebars as aforesaid, said steering damper also including means cooperative with said vane means for applying pressure to said fluid on rotation of said container from center thereby to damp the corresponding rotation of said handlebars, said vane means including valve means actuable by said fluid for suppressing said damping on return of the handlebars to center.

6. The vehicle of claim 5 wherein the cooperative means includes at least one recess in said container.

7. A vehicle having a frame including a head tube, handlebars rotatably connected to said frame, steerable wheel means, means interconnecting said handlebars and said steerable wheel means, said interconnecting means including a steer-tube rotatable within said head tube, said handlebars, steer-tube and steerable wheel means being positioned in a center on linear movement of said vehicle and rotation of said handlebars from center producing corresponding steering rotation of said steerable wheel means from center and rotation of said steer-tube from center and steering rotation of said steerable wheel means from center, as by encounter with an obstruction, producing corresponding rotation of handlebars and said steer-tube from center; said steer-tube including therein a closed compartment for a damping fluid along at least a portion of the length thereof, vane means in said compartment fixedly mounted relative to said steer-tube, whereby on rotation of said steer-tube as a result of rotation of said handlebars directly or as a result of steering rotation of said steerable wheel means, said fluid is compressed by said vane means damping rotation of said handlebars; and means cooperatively associating said vane means and said container for suppressing said damping on return of said handlebars to center.

8. A vehicle having a frame including a head tube, handlebars connected to said frame rotatable relative to said frame, a steer-tube connected to said handlebars rotatable therewith within said head tube upon bearings connected to said frame, a steering damper having a container and vane means within said container adapted to be immersed in a damping medium therein, said container being connected to said steer-tube rotatable therewith relative to said vane means on rotation of said handlebars, and means preventing rotation of said vane means on rotation, as aforesaid of said container with said steer-tube, said preventing means including clamp means connected to said vane means and to said bearings.

9. A vehicle including a frame including a head tube, handlebars connected rotatable to said frame, a steer-tube connected to said frame rotatably with said handlebars within said head tube, and a steering damper including a container and vane means adapted to be immersed in a damping medium in said container, said vehicle being characterized by that the steering damper is mounted within said steer-tube and further characterized by connections between said container and said steer-tube for rotating said container one relative to the other with said vane means.

10. The vehicle of claim 3 characterized by connections between the frame and the vane means for suppressing rotation of the vane means on rotation of the container.

11. The vehicle of claim 10 characterized by that the steer-tube is rotatable on bearings connected to the frame and that the rotation suppressing means is connected to said bearings.

12. A vehicle including a frame including a head tube, handlebars connected rotatable to said frame, a steer-tube connected to said frame rotatable within said head tube with said handlebars and a steering damper including vane means adapted to be immersed in a damping medium in a container; the vehicle being characterized by that the steer-tube is the container of the steering damper and is adapted to containing the damping medium.

13. A vehicle including a frame including a head tube, handlebars connected rotatably to said frame, a steer-tube connected to said handlebars rotatable therewith within said head tube and a steering damper including a container, vane means and a dam adapted to be immersed in a damping medium in said container, said vehicle being characterized by that the steering damper is mounted within said steer-tube with said dam and vane means rotatable one relative to the other with said steer-tube.

14. A vehicle having a frame including a head tube, handlebars mounted rotatable on said frame, steerable wheel means, means including a steer-tube interconnecting said steerable wheel means and said handlebars rotatably within said head tube with said handlebars, a steering damper, and means engaging the inner wall of said steer-tube for at least partially supporting said steering damper in said steer-tube.

15. The vehicle of claim 14 wherein the steer-tube is mounted on the frame on bearings and the steering damper is connected to the supporting means to impress pressure on the bearings.

16. A vehicle of the type having a frame including a head tube and also having a hollow steer-tube mounted rotatable within said head tube on said frame, handlebars mounted rotatably on said frame connected to said steer-tube for rotating said steer-tube in synchronism with said handlebars, steerable wheel means connected to said steer-tube rotatably therewith for steering said vehicle, a steering damping assembly within said steer-tube including vane means and a dam in a damping medium to damp the rotation of said handlebars, and connections between said steer-tube and said assembly for rotating said vane means and dam one relative to the other in said medium on rotation steer-tube by rotation of said handlebars to damp the rotation of said handlebars.

17. The vehicle of claim 16 characterized by one-way valve means cooperative with the rotation of the vane means and the dam one relative to the other coordinated with the direction of rotation of said handlebars to damp the rotation of the handlebars as they depart from center and to suppress the damping of said handlebars as they return to center.

18. The vehicle of claim 16 wherein the valve means is within the vane means.

* * * * *